Figures 1, 2, 3:
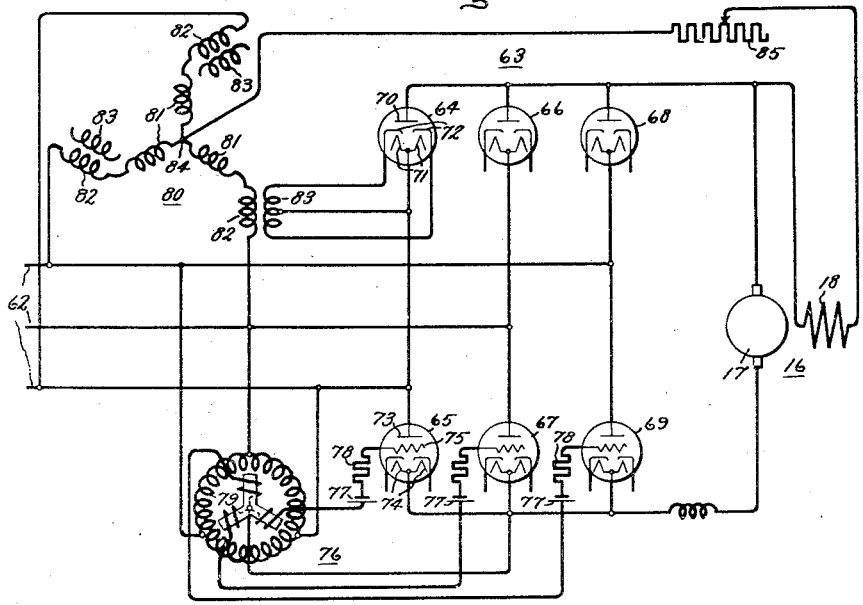

June 30, 1942.                 C. H. WILLIS                  2,288,339
                      ELECTRIC MOTOR CONTROL SYSTEM
              Original Filed Oct. 27, 1937        3 Sheets-Sheet 1

Inventor:
Clodius H. Willis,
by Harry E. Dunham
His Attorney.

June 30, 1942.                C. H. WILLIS                2,288,339
ELECTRIC MOTOR CONTROL SYSTEM
Original Filed Oct. 27, 1937      3 Sheets-Sheet 2

Inventor:
Clodius H. Willis,
by Harry E. Dunham
His Attorney.

June 30, 1942.                C. H. WILLIS                 2,288,339
                        ELECTRIC MOTOR CONTROL SYSTEM
            Original Filed Oct. 27, 1937        3 Sheets-Sheet 3

Inventor:
Clodius H. Willis,
by Harry E. Dunham
His Attorney.

Patented June 30, 1942

2,288,339

UNITED STATES PATENT OFFICE 2,288,339

ELECTRIC MOTOR CONTROL SYSTEM

Clodius H. Willis, Princeton, N. J., assignor to General Electric Company, a corporation of New York Original application October 27, 1937, Serial No. 171,354. Divided and this application December 23, 1938, Serial No. 247,494

13 Claims. (Cl. 172—239)

My invention relates to electric control systems and more particularly to electric valve circuits for controlling electric motors.

This application is a division of my copending application Serial No. 171,354 concerning electric motor control systems, filed October 27, 1937, and assigned to the assignee of the present application.

In the control of dynamo-electric machines, such as motors of the direct current type, it is important to provide control systems which permit great flexibility in the control of an output characteristic, such as the speed thereof, without sacrificing efficiency of operation and economy of apparatus. In accordance with the teachings of my invention described hereinafter, I provide new and improved circuits, such as electric valve rectifying circuits, which may be employed for controlling an operating characteristic, such as the speed, of a direct current motor.

It is an object of my invention to provide a new and improved electric control system.

It is another object of my invention to provide a new and improved electric control system for electric motors.

It is a further object of my invention to provide new and improved electric valve circuits for controlling electric motors.

It is a still further object of my invention to provide new and improved control systems for direct current motors whereby there is afforded great flexibility in speed control, and in which the size and rating of the auxiliary control apparatus are of suitable proportions and economy relative to the size of the motors to be controlled.

In accordance with illustrated embodiments of my invention, I provide an improved control circuit for energizing a direct current motor from an alternating current circuit through electric valve apparatus, whereby there is provided a great flexibility of control. Electric valve apparatus interposed between the alternating current circuit and the armature circuit of the direct current motor is of the full wave type, one half of the electric valves being of the controlled type having control members for controlling the conductivities thereof, and the other half of the electric valves being of the uncontrolled type. The energization of the armature circuit, and hence the speed of the direct current motor, are controlled by controlling the phase of the alternating voltages impressed on the control members of the controlled electric valves. The excitation circuit of the direct current motor is energized from an electrical neutral connection provided by an electrical network energized from the alternating current circuit and from a potential of the uncontrolled electric valves, so that the energization of the excitation circuit is derived from a unidirectional source of substantially constant voltage. Current controlling means are connected in the excitation circuit to control the energization thereof.

Figure 10:
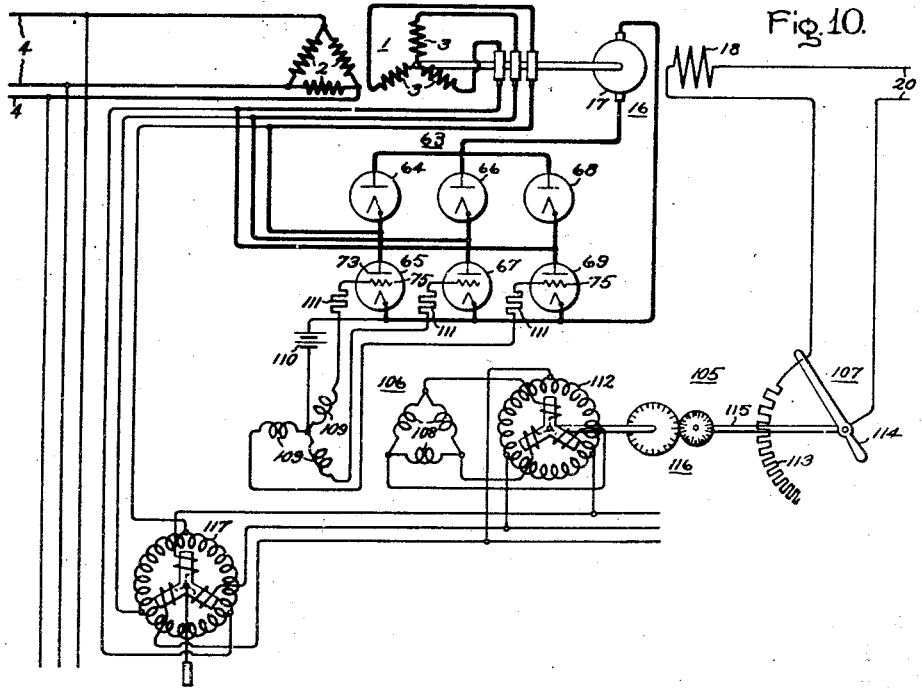
Figure 11:
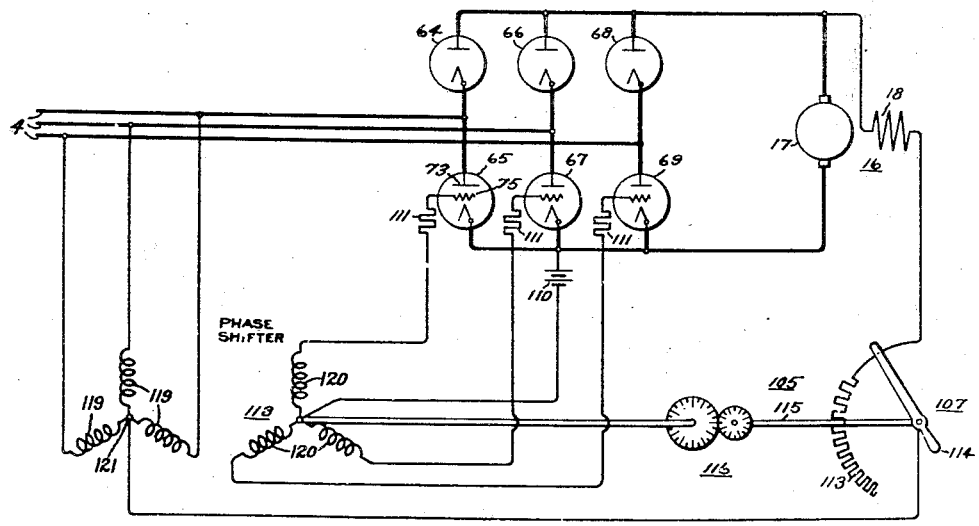

For a better understanding of my invention, reference may be had to the following description taken in connection with the accompanying drawings, and its scope will be pointed out in the appended claims. Fig. 1 represents an embodiment of my invention as applied to an electric valve control system for a direct current motor in which a full wave electric valve apparatus is connected between a polyphase alternating current circuit and the armature circuit of an induction motor. One half of the electric valves are of the controlled type and the other half are of the uncontrolled type. The controlled electric valves are provided with control members and the variation in speed of the direct current motor is effected by controlling the energization of the control members of the electric valves. The field or excitation circuit of the direct current motor is energized in accordance with the voltage appearing between an electrical neutral connection established by an associated electrical network and a potential of the uncontrolled electric valves. Figs. 2 to 9, inclusive, represent certain operating characteristics relating to the arrangement shown in Fig. 1. Fig. 10 represents a still further embodiment of my invention in which the speed of an induction motor is controlled by an electric valve circuit and in which an arrangement is provided for simultaneously controlling the energization of the excitation circuit of an associated direct current motor, and for controlling the conductivity of the electric valve apparatus. Fig. 11 is a modification of the arrangement shown in Fig. 10 as applied to the control of a direct current motor.

Fig. 1 illustrates an embodiment of my invention as applied to an electric valve system for energizing a direct current motor from an alternating current circuit. The direct current motor 16 is energized from an alternating current circuit 62 through electric valve translating apparatus 63 which may be of the full-wave type. One half of the electic valves are of the uncontrolled type and the other half are of the controlled type having control members for controlling the conductivities thereof. The electric valve apparatus 63 includes a plurality of pairs of serially connected electric valves 64—65, 66—67, and 68—69 preferably of the type employing an ionizable medium such as a gas or a vapor. The electric valves 64, 66 and 68 are of the uncontrolled type and each comprises an anode 70 and may include cathodes 71. It is to be understood that the cathodes 71 may be of the filamentary type or may be of the pool type. When the cathodes 71 are of the pool type, the electric valves may also include a pair of holding anodes 72. The holding anodes 72 maintain electric valves 64, 66 and 68 conductive continuously during positive half cycles of applied voltage. Each of the electric valves 65, 67, and 69 includes an anode 73, a pair of cathodes 74, and a control member 75. I provide an excitation current 76 for impressing on control members 75 of electric valves 65, 67, and 69 suitable periodic voltages, such as alternating voltages, to render the electric valves conductive in a predetermined order. Suitable sources of negative unidirectional biasing potential such as batteries 77, and current limiting resistances 78, are connected in series relation with control members 75. To control the phase of the alternating voltages impressed on control members 75 relative to the voltages impressed on the associated anodes 73, I employ a rotary phase shifter 79 which permits control of the conductivities of electric valves 65, 67, and 69 and hence controls the voltage impressed on armature 17 of motor 16.

I provide an electrical network 80 comprising a plurality of windings 81 and 82 and associated secondary windings 83. The network 80 also affords an electrical neutral connected 84 which is connected to one terminal of field winding 18 through a current controlling device such as a variable resistance 95. The other terminal of field winding 18 is connected to the common juncture of electric valves 64, 66, and 68, that is, connected to the anodes 70 of these valves. In this manner there is impressed across the terminals of the field winding 18 a substantially constant unidirectional voltage. The control of the energization of the excitation circuit for machine 16 may be effected by adjustment of the variable resistance 85. One terminal of the armature 17 of motor 16 is connected to the anodes of the uncontrolled electric valves 64, 66, and 68 and the other terminal of the armature circuit 17 is connected to the cathodes of the controlled electric valves 65, 67, and 69. Secondary windings 83 of the inductive network 80 serve as a means for energizing the holding anodes 72 of electric valves 64, 66, and 68.

The curves of Figs. 2 and 3 may be referred to in explaining the operation of the embodiment of my invention shown in Fig. 1. More specifically, the curves of Fig. 2 show the manner in which electric valves conduct current when a full-wave rectifier is employed and when all of the electric valves of the group are phase controlled. The curves of Fig. 3 illustrate the operation when only one-half of the electric valves are phase controlled in the manner shown by the arrangement of Fig. 1. The principal advantage of the arrangement of Fig. 1 resides in the provision of a substantially constant voltage source for the excitation of the field winding 18 of machine 16 and which also permits control of the armature voltage of machine 16. Other benefits derived are principally related to a betterment in power factor conditions of the associated supply circuit 62 and a reduction in the current obtained from the supply circuit.

Figure 4:
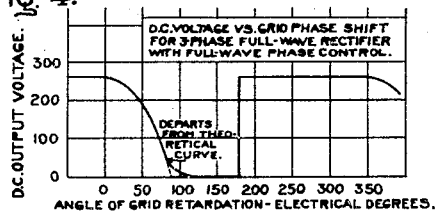
Figure 5:
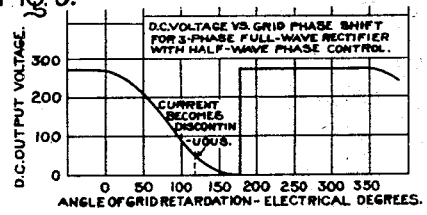
Figure 6:
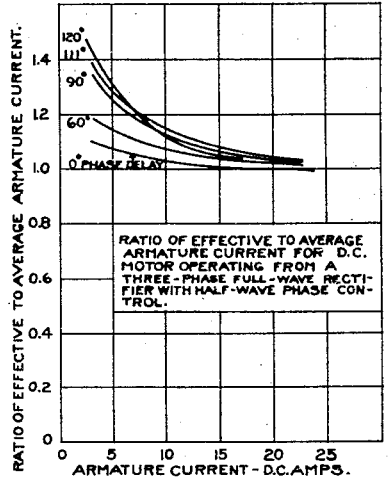
Figure 7:
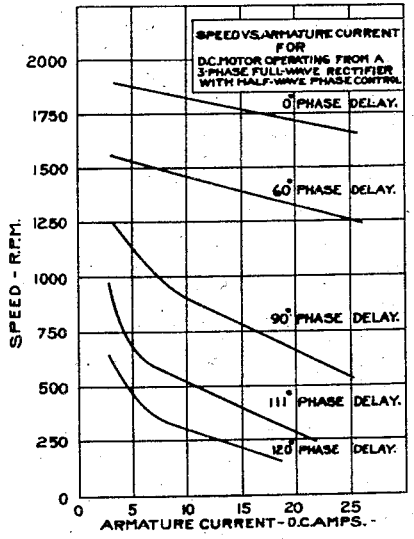
Figure 8:
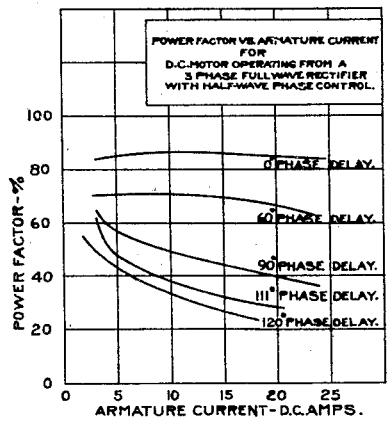
Figure 9:
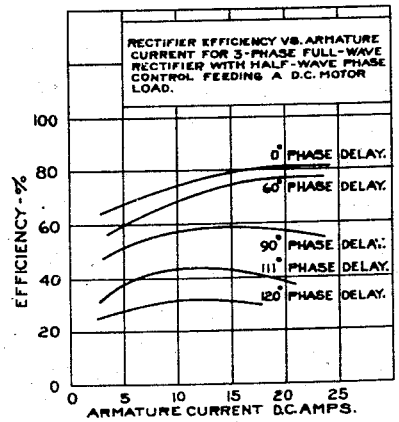

Fig. 4 shows the direct current output voltage as a function of grid voltage retardation where all the electric valves of a full-wave rectifier are phase controlled, and Fig. 5 represents the output voltage as a function of the grid voltage retardation where only half the electric valves are phase controlled. It will be noted that in the lower voltage region the output voltage is extended to a greater range by employing phase shift in only one-half of the electric valves.

Figs. 6–9 appear to be self-explanatory and will not be commented upon at length. These figures represent certain operating characteristics relating to the control of a direct current motor which is energized from a full-wave rectifier and in which only one-half of the electric valves are phase controlled.

Another advantage of the arrangement shown in Fig. 1 is the apparatus economy incident to the employment of the half-wave phase controlled rectifier. It will be noted that the voltage impressed on the excitation winding 18 is of substantially constant magnitude inasmuch as the electric valves 64, 66, and 68 are not controlled. This feature makes it possible to dispense with the need for an auxiliary source of direct current for energizing a field winding and dispenses with the necessity of auxiliary rectifying apparatus where a source of direct current is not available.

Fig. 10 represents another embodiment of my invention as related to an electric valve system for controlling an induction motor in which a direct current motor is energized through electric valve means and returns power to the rotating member of the induction motor. The electric valve apparatus 63 may be of the type in which only one-half of the electric valves are phase controlled, as shown in Fig. 10, or may be of the type in which all of the electric valves are phase controlled.

In order to control conjointly the conductivity of electric valve translating apparatus 63 and the energization of the excitation circuit for direct current motor 16, I provide a control circuit 105 comprising an excitation circuit 106 for controlling the conductivity of the electric valve translating apparatus 63, and a suitable current controlling device such as a rheostat 107 which is connected in circuit with field winding 18 of machine 16. The excitation circuit 106 comprises a transformer having primary windings 108 and secondary windings 109 which impress suitable periodic voltages, such as alternating voltages, on control members 75 of electric valves 65, 67, and 69. A suitable source of negative biasing potential, such as a battery 110, may be employed and current limiting resistances 111 may be connected in series relation with control members 75. A suitable phase shifting arrangement, such as a rotary phase shifter 112, may be connected to excitation circuit 106 to provide an arrangement for controlling the phase of the periodic voltages impressed on control members 75. The current controlling means 107 may comprise a resistance 113 and an actuating member 114. The actuating member 114 is arranged to produce simultaneous control of the energization of winding 18 of machine 16 and control of the phase of the periodic voltages impressed on control members 75. One way in which this simultaneous or joint control may be effected is by the employment of a shaft 115 which interconnects the actuating member 114 and the rotary phase shifter 112. The current controlling means 107 and the excitation circuit 106 may be arranged to control the transfer of power from induced windings 3 to machine 16 in three distinct ways within the various ranges of speed. One way in which this type of speed control may be effected is by design of the resistance 113, so that within the lower range of speed control the transfer of power between induced windings 3 and machine 16 is effected primarily by the phase control of the electric valves. The upper portion of resistance 113 is arranged so that for a predetermined displacement of the actuating member 114 the energization of the field winding 18 is not varied. For an intermediate speed range, the control of the transfer of power between windings 3 and machine 16 is effected by the conjoint control of the excitation of machine 16 and the control of the conductivities of the electric valves. Within the upper range of speed control, the transfer of power between windings 3 and machine 16 is effected primarily by controlling the excitation of machine 16 by controlling the resistance in series with field winding 18. A suitable gear mechanism 116 may be employed to obtain the desired angular displacements of the rotary phase shifter 112 in accordance with adjustment of the actuating member 114.

The excitation circuit 106 may be energized from any suitable source of alternating current correlated in phase and frequency relative to the voltage of the induced winding 3 of machine 1, and is shown as being connected to the induced winding 3. A suitable phase shifting arrangement, such as a rotary phase shifter 117, is interposed between the induced winding 3 and the excitation circuit 106 to permit adjustment of the phase of the periodic voltages impressed on control members 75 of electric valves 65, 67, and 69. An operating condition, such as the speed of induction motor 1, may be controlled by causing the direct current motor 16 to absorb variable amounts of power from the induced winding 3 through the electric valve apparatus 63. The speed of induction motor 1 may be controlled by the adjustment of the actuating member 114, which controls the energization of field winding 18 of machine 16 and controls the conductivities of electric valves 65, 67, and 69. For the position of the actuating member 114 shown in Fig. 10, the speed of the induction motor 1 will be minimum. The speed of the induction motor 1 may be increased by rotating the actuating member 114 in a counter-clockwise direction of rotation. At the minimum speed value, the field excitation of machine 16 is maximum and the armature voltage of machine 16 is zero. Within the first range of speed control, the field resistance is maintained substantially constant and the speed is increased by increasing the voltage impressed on armature 17 of machine 16 due to the advance in phase of the voltages impressed on control members 75. Within the intermediate range of speed control, the excitation of machine 16 and the armature voltage impressed on armature 17 are varied simultaneously. That is, within the intermediate range, resistance is inserted in series with field winding 18 and the armature voltage is increased. Within the third or upper range of speed control, an increase in speed is effected primarily by decreasing the energization of field winding 18 by the insertion of a larger amount of resistance in series therewith. During this last range of speed control, the voltage impressed on armature 17 of machine 16 is substantially constant. The operating characteristics shown in Fig. 5 may be referred to in explaining the effect of the control of the conductivities of electric valves 65, 67 and 69 with respect to these ranges of speed control. Within the first range of speed control, the voltages impressed on control members 75 are advanced in phase from approximately the one hundred degree position to the fifty degree position; within the second or intermediate range of speed control voltages impressed on control members 75 are advanced in phase from the fifty degree position to zero position; and within the third or upper speed range, the voltages are advanced in phase beyond the zero position. By this arrangement it is clear that the conjoint control of the excitation of machine 16 and the control of the armature voltage may be effected without employing apparatus which is complicated in construction and operation. The rotary phase shifter 117 may be adjusted to control independently the speed of the motor 1 and the power factor at which power is transmitted from induced windings 3. In this manner, the power factor of the induction motor 1 may be controlled independently.

In Fig. 11 of the accompanying drawings there is diagrammatically illustrated a modification of the arrangement shown in Fig. 10 as applied to an electric valve circuit for controlling the speed of a direct current motor. Many of the elements of the arrangement shown in Fig. 11 are similar to those shown in Fig. 10 and corresponding elements have been assigned like reference numerals. The armature 17 of the motor 16 is connected to be energized from the alternating current circuit 4 through electric valves 64—69. Electric valves 64, 66 and 68 are of the uncontrolled type and electric valves 65, 67 and 69 are of the controlled type which control the voltage impressed in armature 17.

As an agency for controlling the conductivities of electric valves 65, 67 and 69 and as an arrangement for providing an electrical neutral connection for field winding 18 of machine 16, I provide a phase shifter 118 having primary windings 119 and secondary windings 120. Primary windings 119 are connected to provide an electrical neutral connection 121 which is connected to one terminal of field winding 18 through the controller 107. The other terminal of the field winding 18 is connected to the armature 17 and the common juncture of the uncontrolled electric valves 64, 66 and 68. Secondary windings 120 of phase shifter 118 impress alternating voltages on control members 75 of electric valves 65, 67 and 69.

The operation of the arrangement shown in Fig. 11 is substantially the same as that explained above in connection with the control system of Fig. 10. Briefly, the speed of the direct current motor 16 is controlled by variation in the voltage applied to the armature 17 and by control of the energization of the field winding 18. The controller 107 and the phase shifter 118 are arranged to obtain the above described three ranges of speed control. That is, in the first or lower range of speed control, the variation in speed of motor 16 is obtained primarily by control of the armature voltage of machine 16; the second or intermediate range of speed control is obtained by the conjoint variation in the excitation of machine 16 and by the variation of armature voltage; and in the third or upper range of speed control the variation in speed of machine 16 is effected primarily by control of the excitation of machine 16.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a source of alternating current, a dynamo-electric machine of the direct current type including armature and excitation circuits, an electrical network connected to said alternating current circuit and having an electrical neutral connection, electric translating apparatus connected between said alternating current circuit and said armature circuit and comprising a pair of serially connected electric valves, only one of said electric valves being provided with a control member for controlling the conductivity thereof, said excitation circuit being connected to be energized in accordance with the voltage appearing between the other of said electric valves and said neutral connection, and means for energizing said control member to control an electrical characteristic of said machine.

2. In combination, a polyphase alternating current circuit, a dynamo-electric machine of the direct current type having armature and excitation circuits, an electrical network connected to said alternating current circuit and having an electrical neutral connection, electric translating apparatus connected between said alternating current circuit and the armature circuit and comprising a plurality of pairs of serially connected electric valves, said pairs of electric valves being connected across the armature circuit, one electric valve in each of said pairs of electric valves being provided with a control member for controlling the conductivity thereof and the other valve in each pair being of the uncontrolled type, the excitation circuit being connected to be energized in accordance with the unidirectional voltage appearing between said neutral connection and the uncontrolled electric valves, and means for energizing the control members to control an electrical characteristic of said machine.

3. In combination, a polyphase alternating current circuit, an electrical network energized from said circuit and having a neutral connection, a dynamo-electric machine of the direct current type having armature and excitation circuits, a plurality of pairs of serially connected electric valves connected between said alternating current circuit and the armature circuit, said pairs of electric valves being connected across said armature circuit and each pair of electric valves including one controlled electric valve having a control member for controlling the conductivity thereof and the other valve in each pair being of the uncontrolled type, one terminal of said excitation circuit being connected to said neutral connection and the other terminal of said excitation circuit being connected to the uncontrolled electric valves in said pairs of valves, and means for energizing the control members to control an electrical characteristic of said machine.

4. In combination, a polyphase alternating current circuit, a dynamo-electric machine of the direct current type having armature and excitation circuits, electric translating apparatus connected between said alternating current circuit and the armature circuit and comprising a plurality of pairs of serially connected electric valves, each pair of electric valves comprising a controlled electric valve and an uncontrolled electric valve, the common juncture of the controlled electric valves being connected to one terminal of the armature circuit and the common juncture of the uncontrolled electric valves being connected to the other terminal of the armature circuit, and an electrical network connected to said alternating current circuit and having an electrical neutral connection, the excitation circuit of said machine being connected between said neutral connection and the common juncture of the uncontrolled electric valves.

5. In combination, a polyphase alternating current circuit, a dynamo-electric machine of the direct current type having armature and excitation circuits, electric translating apparatus connected between said alternating current circuit and the armature circuit and comprising a plurality of pairs of serially connected electric valves, each pair of electric valves comprising a controlled electric valve and an uncontrolled electric valve, the common juncture of the controlled electric valves being connected to one terminal of the armature circuit and the common juncture of the uncontrolled electric valves being connected to the other terminal of the armature circuit, an electrical network connected to said alternating current circuit and having an electrical neutral connection, the excitation circuit of said machine being connected between said neutral connection and the common juncture of the uncontrolled electric valves, and means for controlling the energization of said excitation circuit.

6. In combination, a polyphase alternating current circuit, a dynamo-electric machine of the direct current type including armature and excitation circuits, electric translating apparatus connected between said alternating current circuit and said machine and comprising a plurality of pairs of serially connected electric valves, each of said pairs including an uncontrolled electric valve and a controlled electric valve having a control member for controlling the conductivity thereof, the common juncture of said uncontrolled electric valves being connected to one terminal of the armature circuit and the common juncture of the controlled electric valves being connected to the other terminal of the armature circuit, an electrical network connected to said alternating current circuit and having an electrical neutral connection, one terminal of the excitation circuit being connected to said neutral connection and the other terminal being connected to the common juncture of the uncontrolled electric valves, means for controlling the energization of said excitation circuit, and means for energizing the control members to control an electrical characteristic of said machine.

7. In combination, a source of alternating current, an electrical network connected to said circuit and having an electrical neutral connection, electric translating apparatus connected to said source and comprising a pair of serially connected electric valves, only one of said electric valves being provided with a control member for controlling the conductivity thereof, a direct current circuit connected to said electric valves, means for energizing said control member to control an electrical condition of said direct current circuit, and a second direct current circuit energized in accordance with the voltage appearing between the other of said electric valves and said neutral connection.

8. In combination, a source of alternating current, electric translating apparatus connected to said source and comprising a serially connected uncontrolled electric valve and a controlled electric valve having a control member for controlling the conductivity thereof, an electrical network connected to said source and having an electrical neutral connection, a substantially constant voltage, direct current circuit connected to be energized in accordance with the voltage appearing between said neutral connection and said uncontrolled electric valve, and a variable voltage circuit energized in accordance with the voltage appearing across said serially connected electric valves.

9. In combination, a source of alternating current, a direct current circuit, electric translating apparatus connected to said source and comprising a serially-connected uncontrolled electric valve and a controlled electric valve having a control member for controlling the conductivity thereof, said electric valves each having a holding anode, said direct current circuit being connected across said serially-connected electric valves, an electrical network connected to said source and having an electrical neutral connection and winding for energizing the holding anodes, and a second direct current circuit connected to be energized in accordance with the unidirectional voltage appearing between said uncontrolled electric valve and said neutral connection.

10. In combination, a source of alternating current, a direct current circuit, electric translating apparatus connected to said source and comprising a serially-connected uncontrolled electric valve and a controlled electric valve having a control member for controlling the conductivity thereof, said electric valves each having a holding anode, said direct current circuit being connected across said serially-connected electric valves, an electrical network connected to said source and having an electrical neutral connection and windings for energizing said holding anodes, a second direct current circuit connected to be energized in accordance with the unidirectional voltage appearing between said uncontrolled electric valve and said neutral connection, and means for energizing the control member to control an electrical condition of said first mentioned direct current circuit.

11. In combination, an alternating current circuit, a direct current motor having armature and excitation circuits, electric translating apparatus connected between said alternating current circuit and the armature circuit and comprising a serially-connected uncontrolled electric valve and a controlled electric valve having a control member for controlling the conductivity thereof, and a phase shifting circuit for impressing on said control member a periodic voltage variable in phase to control the voltage impressed on the armature circuit and including an electrical network connected to said alternating current circuit having an electrical neutral connection, said excitation circuit being connected between the uncontrolled electric valve and said neutral connection.

12. In combination, an alternating current circuit, a direct current motor having armature and excitation circuits, electric translating apparatus connected between said alternating current circuit and the armature circuit and comprising a serially-connected uncontrolled electric valve and a controlled electric valve having a control member for controlling the conductivity thereof, a phase shifting device for impressing on said control member a periodic voltage to control the voltage impressed on the armature circuit and including an inductive network connected to said alternating current circuit having an electrical neutral connection, said excitation circuit being connected between the uncontrolled electric valve and said neutral connection, and means for conjointly controlling said phase shifting device and the energization of said excitation circuit.

13. In combination, an alternating current circuit, a dynamo-electric machine having an armature winding and a control winding, electric translating apparatus connected between said circuit and said winding and comprising means for rectifying both half cycles of voltage of said alternating current circuit including a pair of electric valves only one of which is of the type having a control member for controlling the current transmitted to said winding, means for energizing said control winding at constant voltage from said electric translating apparatus, and means for impressing a voltage on said control member to control the current conducted by said electric valve means to energize variably said armature winding.

CLODIUS H. WILLIS.

CERTIFICATE OF CORRECTION.

Patent No. 2,288,339.

June 30, 1942.

CLODIUS H. WILLIS.

It is hereby certified that error appears in the printed specification of the above numbered patent requiring correction as follows: Page 2, first column, line 17, for "current" read --circuit--; and line 39, for "resistance 95" read --resistance 85--; and that the said Letters Patent should be read with this correction therein that the same may conform to the record of the case in the Patent Office.

Signed and sealed this 11th day of August, A. D. 1942.

Henry Van Arsdale,
Acting Commissioner of Patents.

(Seal)